(12) United States Patent
Lee (10) Patent No.: US 8,789,992 B2
(45) Date of Patent: *Jul. 29, 2014

(54) LIGHT PIPE AND ILLUMINATING DEVICE HAVING THE SAME

(75) Inventor: Sang Hoon Lee, Chungju-si (KR)

(73) Assignee: LG Electronics Inc., Seoul (KR)

( * ) Notice: Subject to any disclaimer, the term of this patent is extended or adjusted under 35 U.S.C. 154(b) by 614 days.

This patent is subject to a terminal disclaimer.

(21) Appl. No.: 12/267,874

(22) Filed: Nov. 10, 2008

(65) Prior Publication Data

US 2009/0279305 A1 Nov. 12, 2009

(30) Foreign Application Priority Data

May 8, 2008 (KR) ........................ 10-2008-0042840

(51) Int. Cl.
*F21V 7/04* (2006.01)
*G02B 6/00* (2006.01)
*G09F 13/00* (2006.01)

(52) U.S. Cl.
USPC .......................................... 362/551; 362/582

(58) Field of Classification Search
USPC ..................... 362/296.01, 340, 257, 310, 551
See application file for complete search history.

(56) References Cited

U.S. PATENT DOCUMENTS

| 4,750,798 | A | | 6/1988 | Whitehead |
| 4,996,632 | A | | 2/1991 | Aikens ............................. 362/32 |
| 5,132,881 | A | * | 7/1992 | Wakimizu et al. ............ 362/539 |
| 5,134,549 | A | | 7/1992 | Yokoyama |
| 5,258,896 | A | | 11/1993 | Dreyer, Jr. ..................... 362/307 |
| 5,700,077 | A | | 12/1997 | Dreyet et al. |
| 5,745,632 | A | | 4/1998 | Dreyer |
| 6,123,442 | A | * | 9/2000 | Freier et al. .................... 362/559 |
| 6,243,150 | B1 | * | 6/2001 | Watanabe et al. ............... 349/65 |
| 6,425,673 | B1 | * | 7/2002 | Suga et al. ..................... 362/613 |
| 6,520,655 | B2 | | 2/2003 | Ohuchi |
| 6,612,729 | B1 | | 9/2003 | Hoffman |
| 6,706,339 | B1 | * | 3/2004 | Miyatake et al. ............ 428/1.31 |
| 6,796,686 | B2 | | 9/2004 | Jacob et al. |
| 7,553,045 | B2 | | 6/2009 | Hung ....................... 362/249.01 |
| 7,658,514 | B2 | | 2/2010 | Lee et al. |
| 7,748,874 | B2 | | 7/2010 | Cho |
| 2002/0141065 | A1 | | 10/2002 | Cowan et al. |
| 2004/0066654 | A1 | | 4/2004 | Jacob et al. |
| 2004/0218390 | A1 | | 11/2004 | Holman et al. ................ 362/245 |
| 2007/0018185 | A1 | | 1/2007 | Hung .............................. 257/98 |
| 2008/0089654 | A1 | | 4/2008 | Lee et al. |

FOREIGN PATENT DOCUMENTS

| CN | 1451099 | 10/2003 |
| CN | 1504773 | 6/2004 |
| CN | 2879153 Y | 3/2007 |

(Continued)

OTHER PUBLICATIONS

English language translation of Chinese Office Action dated Nov. 25, 2010 for Application 200810182910.0.

(Continued)

*Primary Examiner* — Jason Moon Han
*Assistant Examiner* — Jessica M Apenteng
(74) *Attorney, Agent, or Firm* — KED & Associates LLP (57) ABSTRACT

A light pipe and an illuminating device having the light pipe may be provided. The light pipe may include an optical film having a glass transition temperature of approximately 110° C. to approximately 180° C.

18 Claims, 8 Drawing Sheets

(56) References Cited

FOREIGN PATENT DOCUMENTS

| | | |
|---|---|---|
| CN | 1971316 | 5/2007 |
| CN | 201003697 | 1/2008 |
| CN | 101122650 | 2/2008 |
| DE | 298 05 667 U1 | 7/1998 |
| EP | 0 225 123 A2 | 6/1987 |
| EP | 1 591 826 A1 | 11/2005 |
| EP | 1 775 603 | 4/2007 |
| GB | 2 145 760 A | 4/1985 |
| JP | 2001-074919 | 3/2001 |
| KR | 10-2002-0091255 | 12/2002 |
| KR | 10-2008-0014387 | 2/2008 |
| WO | WP 95/30218 A1 | 11/1995 |
| WO | WO 01/71396 | 9/2001 |
| WO | WO 2007/046337 A1 | 4/2007 |
| WO | WO 2007/064615 A1 | 6/2007 |

OTHER PUBLICATIONS

English language translation of Chinese Office Action dated Dec. 14, 2010 for Application 200810182909.8.
U.S. Office Action for U.S. Appl. No. 12/268,160 dated Dec. 1, 2009.
European Office Action dated Feb. 23, 2010 for related application 08019377.4.
European Office Action dated Feb. 23, 2010 for related application 08019376.6.
Korean Office Action dated Feb. 25, 2010 for related application 95-2010-008452107.
Korean Office Action dated Feb. 25, 2010 for related application 95-2010-008360756.
Office Action dated Apr. 5, 2011 from U.S. Appl. No. 12/267,844.
Office Action dated Mar. 21, 2011 from U.S. Appl. No. 12/267,856.
English translation of Chinese Office Action dated Apr. 29, 2010.
English translation of Chinese Office Action dated Jun. 4, 2010 for Chinese Application No. 200810182910.0.
European Search Report dated Aug. 5, 2009 for Application No. 08019376.6.
European Search Report dated Aug. 5, 2009 for Application No. 08019377.4.
European Search Report dated Aug. 5, 2009 for Application No. 08019379.0.
Office Action dated Oct. 5, 2010 for U.S. Appl. No. 12/267,856.
Chinese Office Action for Application 200810182910.0 dated Jul. 13, 2011.
European Examination Report dated May 14, 2012 for Application 08 019 379.0.

\* cited by examiner

Fig.1

——— LIGHT AIR
------- LIGHT IN OPTICAL FILM

Fig.2

——— LIGHT AIR
------- LIGHT IN OPTICAL FILM

Fig.10 ced-ing device 300 may
LIGHT PIPE AND ILLUMINATING DEVICE HAVING THE SAME

This application claims priority from Korean Patent Application No. 10-2008-0042840, filed May 8, 2008, the subject matter of which is incorporated herein by reference.

BACKGROUND

1. Field

Embodiments of the present invention may relate to a light pipe and an illuminating device having the light pipe. More particularly, embodiments of the present invention may relate to a light pipe including an optical film formed of a material having a glass transition temperature of 110° C. to 180° C.

2. Background

Illuminating devices that include a light pipe capable of transmitting light to a remote place with less transmission loss may be used in various places (for example, inside and outside a building). Light pipes may also be referred to as light conduits, light guides or light tubes, and have been used to effectively distribute light across a wide area for various purposes such as for illumination.

Light pipes may be used not only for illuminating certain points but also for illuminating whole areas. Light that transmits through a light pipe may be distributed to outside of the light pipe for illuminating certain points or for maximizing the effect of illumination.

However, illuminating devices using a light pipe may provide different illuminance levels according to their distances from a light source, and thus may not be able to achieve uniform brightness across a longitudinal direction of a light pipe.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
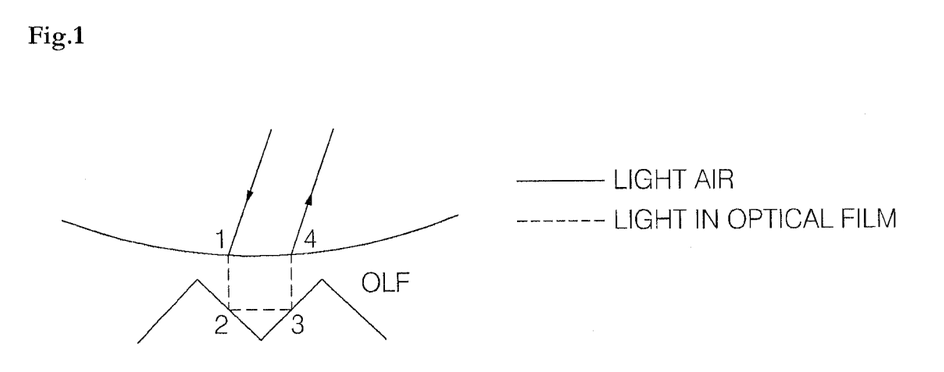
FIG. 1 illustrates a cross-sectional view of an optical film of a light pipe.
Figure 2:
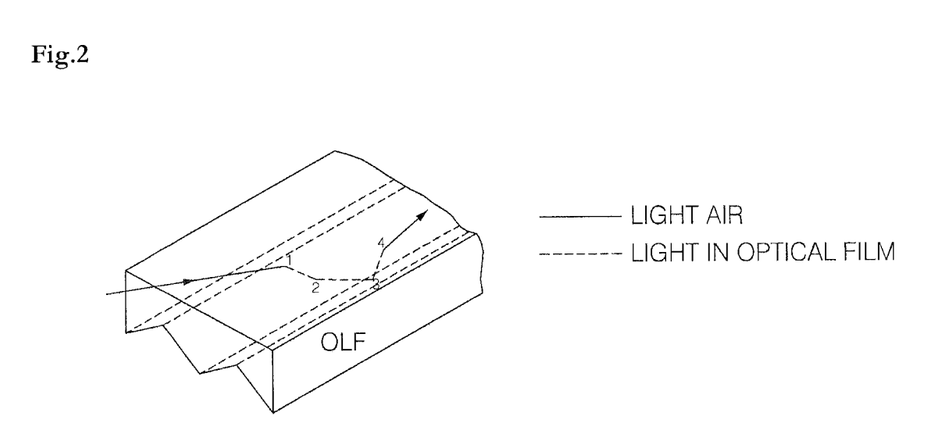
FIG. 2 illustrates a perspective view of the optical film shown in FIG. 1.

FIGS. 1 and 2 illustrate diagrams of an optical film of a light pipe and explain transmission and reflection of light in a light pipe. Other embodiments and configurations are also within the scope of the present invention.

More specifically, FIG. 1 illustrates a cross-sectional view of an optical film and explains transmission and reflection of light in a light pipe. FIG. 2 illustrates a perspective view of the optical film shown in FIG. 1. For ease of discussion, a patterned surface of an optical film is a top surface of the optical film, and a non-patterned surface of the optical film is a bottom surface of the optical film.

As shown in FIGS. 1 and 2, light generated by a light source unit (not shown) of a light pipe may be incident upon a non-patterned surface of an optical film (OLF) and may then be refracted at position 1 on the optical film. The refracted light may be totally reflected at positions 2 and 3 on both lateral sides of a prism of the optical film. The totally-reflected light may be refracted at position 4 on the optical film and may be thus incident back into the light pipe.

Light may travel along a longitudinal direction of the light pipe. Since light loss rarely occurs in air inside the light pipe, the light pipe can effectively transmit light even to a distant area without any light loss (or with minimal light loss).

Figure 3:
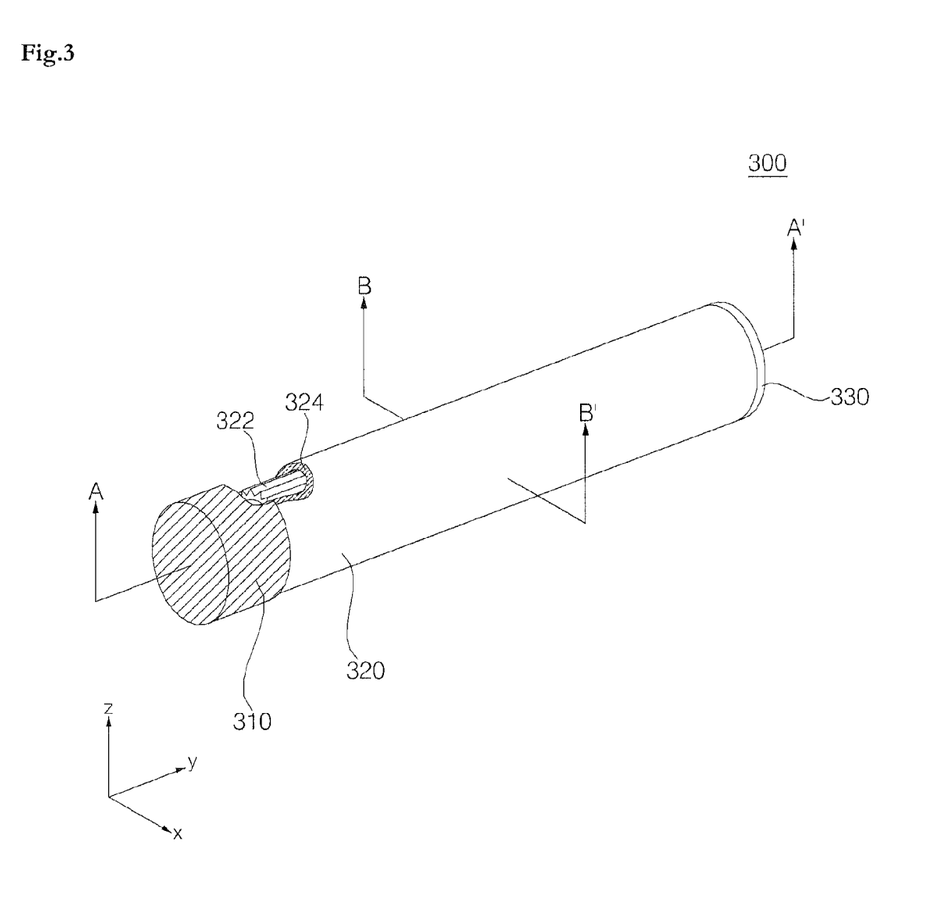
FIG. 3 illustrates a perspective view of an illuminating device according to an example embodiment of the present invention.
Figure 4:
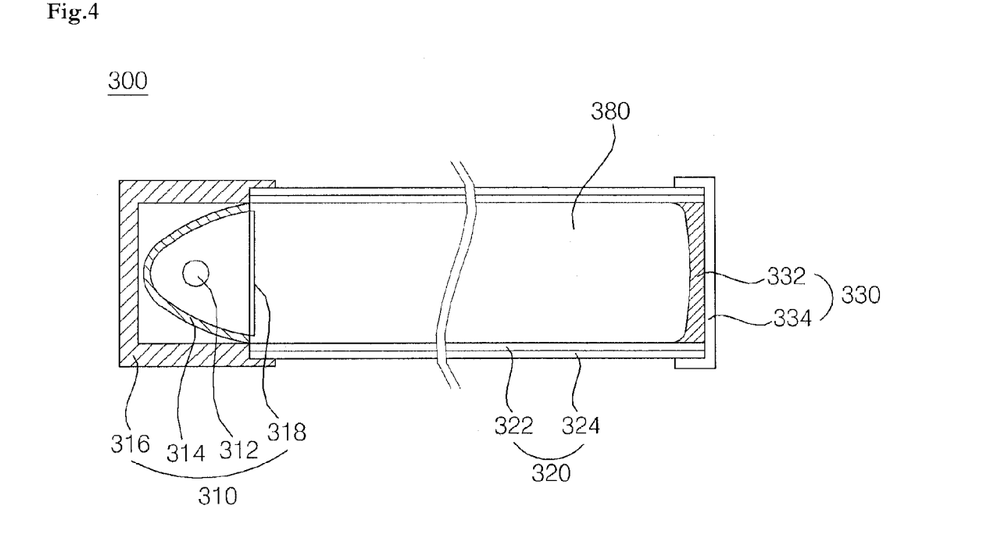
FIG. 4 illustrates a cross-sectional view of the illuminating device taken along line A-A' of FIG. 3.
Figure 5:
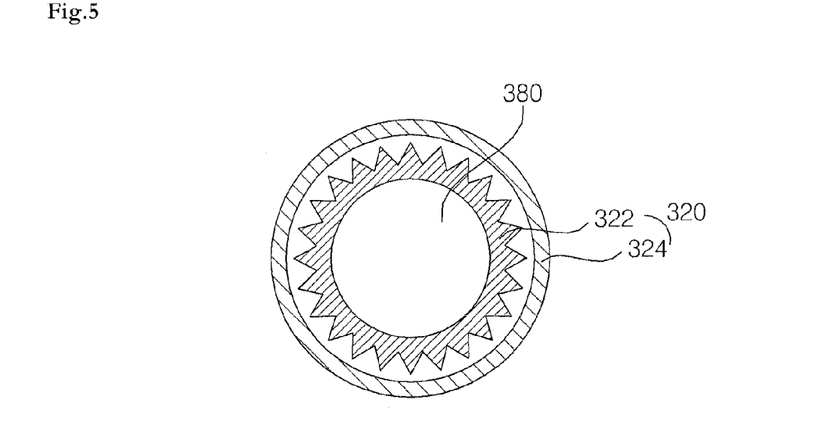
FIG. 5 illustrates a cross-sectional view of a light pipe taken along line B-B' of FIG. 3.

FIGS. 3-5 illustrate diagrams of an illuminating device according to an example embodiment of the present invention. Other embodiments and configurations are also within the scope of the present invention.

As shown in FIG. 3, an illuminating device 300 may include a light source unit 310, a light pipe 320 and a reflecting cap 330.

The light source unit 310 may generate light and provide the generated light to the light pipe 320. The light source unit 310 may include at least one light source 312 that generates light. Light generated by the light source unit 310 may be provided to the light pipe 320 and may thus be emitted to outside of the illuminating device 300 through the light pipe 320.

The light pipe 320 may emit light by transmitting and distributing light generated by the light source unit 310. The light pipe 320 may include an optical film 322 that evenly distributes light by reflecting or refracting the light generated by the light source unit 310.

The optical film 322 may have a patterned surface on which a plurality of prism patterns are provided. For example, the plurality of prisms may form a plurality of peaks and a plurality of valleys formed from the plurality of peaks. The optical film 322 may be rolled up into a cylinder having a hollow conduit extending along a longitudinal array (or direction) of the prism patterns (e.g., a Y direction). The rolled shape may be a fully rolled shape or a partially rolled shape. The optical film 322 may transmit light to a distant place from the light source unit 310 by reflecting or refracting light generated by the light source unit 310. The optical film 322 may include the plurality of prism patterns each extending along a longitudinal direction of a base pipe 324.

When the light source unit 310 generates light, heat may be generated and may thus deform the prism patterns of the optical film 322. Once the prism patterns of the optical film 322 are deformed, total reflection efficiency of the optical film 322 may considerably decrease, and thus the optical film 322 may not properly transmit light. In order to address this, the optical film 322 may be formed of a heat-resistant material, and a glass transition temperature Tg of the optical film 322 may need to be higher than a predefined value.

The glass transition temperature Tg of the optical film 322 will be described in further detail with reference to FIGS. 4 and 5.

The reflecting cap 330 may be attached to one end of the light pipe 320. The reflecting cap 330 may reflect light transmitted or distributed by the light pipe 320. The light source unit 310 and the reflecting cap 330 may be disposed on opposite ends (or sides) of the light pipe 320. The reflecting cap 330 may include a reflector 332 coupled to the light pipe 320. The reflector 332 reflects light transmitted by the light pipe 320. The reflecting cap 330 may confine light emitted from the light source unit 310 in the light pipe 320. This may improve brightness of the illuminating device 300.

FIG. 4 illustrates a cross-sectional view of the illuminating device 300 taken along line A-A' of FIG. 3. As shown in FIG. 4, the light source unit 310 may include the light source 312 that generates light, a reflective mirror 314 disposed at a rear of the light source 312, a shield filter 318 disposed at a front of the light source 312, and a housing 316 that houses the light source 312 and the reflective mirror 314.

The light source 312 may be supplied with power by an external power source and may thus generate light. Examples of the light source 312 may include a high intensity discharge (HID) lamp, an electrodeless fluorescent lamp (EFL), a solid state lamp, and a metal halide lamp.

The light source 312 may generate heat and may thus be heated to a high temperature while generating light. As a result, the optical film 322, formed of a polymer, may be thermally deformed. The optical film 322 may have a plurality of sophisticated prism patterns that cause total reflection of light. If the prism patterns of the optical film 322 are deformed by heat generated by the light source 312, total reflection of light may not occur, and thus efficiency of the light pipe 300 may considerably decrease.

A glass transition temperature Tg is a temperature at which a polymer begins to flow. The prism patterns of the optical film 322 may be deformed at a temperature higher than the glass transition temperature Tg of the optical film 322. If the prism patterns of the optical film 322 melt or are damaged, the optical film 322 may not be able to totally reflect light. Therefore, the optical film 322 may need to be formed of a material that is robust against heat generated by the light source 312 in order for the optical film 322 to totally reflect light.

The reflective mirror 314 may be disposed at a rear of the light source 312. The reflective mirror 314 may reflect light generated by the light source 312 and thus may make the light reflected by the reflective mirror 314 incident into the light pipe 320. The structure of the reflective mirror 314 may be altered according to length of the light pipe 320. The reflective mirror 314 may be formed as an aspherical reflective mirror. The reflective mirror 314 may be formed of a material (such as a metal or a plastic material) that can be easily processed. The surface of the reflective mirror 314 may be coated with a film that is formed of a highly-reflective metal material such as aluminum or silver.

The shield filter 318 may be formed of glass, for example, and the shield filter 318 may protect the light pipe 320 against heat generated by the light source 312.

The housing 316 may have an empty space therein and may thus hold the light source 312 and the reflective mirror 314 therein. The housing 316 may be formed of a material (such as a metal) that is highly rigid, heat-resistant, and can be easily processed.

Light generated by the light source unit 310 may be incident into the light pipe 320. The light pipe 320 may not only transmit the light generated by the light source unit 310 in the longitudinal direction of the light pipe 320 but may also distribute the light generated by the light source unit 310 to outside of the illuminating device 300. The light pipe 320 may also include the optical film 322 and the base pipe 324. The optical film 322 may be provided in a hollow conduit of the base pipe 324.

The optical film 322 may be rolled up into a cylinder having a same length as the base pipe 324. The optical film 322 may be provided in a rolled shape (either fully rolled or partially rolled) and have a hollow conduit. The optical film 322 may be formed of a thermoplastic material with high optical transmittance and well-balanced mechanical and electrical properties. For example, the optical film 322 may be formed of polymethyl metacrylate (PMMA), polyethylene terephthalate (PET) or polycarbonate.

Since the optical film 322 is formed of a polymer, the prism patterns of the optical film 322 may be thermally deformed at a temperature higher than the glass transition temperature Tg of the optical film 322. Therefore, the optical film 322 may be sufficiently heat-resistant against heat generated by the light source 312.

The deformation of an object having a glass transition temperature Tg of 100° C. may begin at a temperature lower than the glass transition temperature Tg of 100° C., for example, at a temperature of approximately 85° C.-90° C., and may end at a temperature of approximately 110° C. The peak temperature at which deformation of the object occurs most severely is referred to as the glass transition temperature Tg of the object.

The temperature at which the deformation of an object begins is not necessarily the glass transition temperature Tg of the object, and may be lower than the glass transition temperature Tg of the object.

The light source unit 310 may be heated up to a temperature of 300° C. when the lamp 312 is an HID lamp. Since the light source unit 310 can be heated to such a high temperature by simply generating light, the shield filter 318, which is formed of glass for example, may be disposed at a front of the light source 312. The shield filter 318 may be heated to a temperature of 120° C.-150° C. by the light source unit 310. The temperature at a connection between the light source unit 310 and the light pipe 320 may be approximately 100° C. Thus, if the optical film 322 is formed of a material having a glass transition temperature Tg lower than 110° C., the optical film 322 may be easily deformed. Therefore, the optical film 322 may need to be formed of a material having a glass transition temperature Tg higher than 110° C.

The higher the glass transition temperature Tg of a material, the more difficult it becomes to form the optical film 322 using the object. More specifically, if the optical film 322 is formed of a material having a glass transition temperature Tg higher than 180° C., efficiency of the fabrication of the optical film 322 may considerably decrease. Therefore, the optical film 322 may be formed of a material having a glass transition temperature of approximately 110° C.-180° C.

More specifically, the optical film 322 may be formed of at least one selected from a group consisting of polycarbonate (Tg: 150° C.), syndiotactic PMMA (Tg: 126° C.), atatic PMMA (Tg: 114° C.), polyether ether ketone (PEEK, Tg: 140° C.), and polyethylene naphthalate (PEN, Tg: 123° C.).

In this manner, thermal stability may be secured for the optical film 322 and may thus prevent deformation of the prism patterns of the optical film 322. Therefore, efficiency of the light pipe 320 may be maintained.

A surface of the optical film 322 may be patterned by forming a plurality of prism patterns. The plurality of prism patterns may form a plurality of peaks and a plurality of valleys formed from the plurality of peaks. The optical film 322 may be rolled up into a cylinder having the hollow conduit 380. That is, the optical film 322 may be provided in a rolled shape (either fully or partially). The cylinder of the optical film 322 may be inserted into the base pipe 324. The surface having the plurality of prism patterns may face the base pipe 324. The prism patterns of the optical film 322 may be formed as inequilateral triangles, isosceles triangles, trapezoids or regular triangles, for example. More specifically, the prism patterns of the optical film 322 may be formed as isosceles triangles having an angle of approximately 90 degrees.

The base pipe 324 may be formed of a thermoplastic resin material with high optical transmittance and well-balanced mechanical, heat-resistance and electrical properties. For example, the base pipe 324 may be formed of PMMA, polycarbonate or PET. The base pipe 324 may be formed of PMMA, which is suitable for use in fabrication of light sources because PMMA is highly rigid, is rarely deformed and has high visible light transmittance.

The reflecting cap 330 may include a cap 334 and the reflector 332 disposed on an inner side of the cap 334. The reflector 332 may be disposed at an end of the light pipe 320 and may reflect light arriving at the end of the light pipe 320. The surface of the reflector 332 may be coated with a highly-reflective metal such as aluminum or silver.

FIG. 5 illustrates a cross-sectional view of the light pipe taken along line B-B' of FIG. 3. An outer surface of the optical film 322 may be patterned as shown in FIG. 5. Alternatively, an inner surface of the optical film 322 may be patterned.

One surface of the optical film 322 may be patterned by forming a linear array of prisms, whereas the other surface of the optical film 322 may be substantially smooth or substantially flat.

A plurality of prism patterns may be formed on one surface of the optical film 322. The plurality of prism patterns may form a plurality of peaks and a plurality of valleys formed from the plurality of peaks. The prism patterns of the optical film 322 may be formed as inequilateral triangles, isosceles triangles, trapezoids or regular triangles, for example. More specifically, the prism patterns of the optical film 322 may be formed as isosceles triangles having an angle of approximately 90 degrees.

The optical film 322 may be formed of at least one selected from a group consisting of polycarbonate (Tg: 150° C.), syndiotactic PMMA (Tg: 126° C.), atatic PMMA (Tg: 114° C.), PEEK (Tg: 140° C.), and PEN (Tg: 123° C.).

The temperature at a portion of the optical film 322 near the light source unit 310 may increase up to approximately 100° C. due to heat generated by the light source unit 310. If the optical film 322 is formed of a material having a glass transition temperature Tg of approximately 110° C.-180° C., the optical film 322 may be prevented from being deformed by heat generated by the light source 312, and thus a shape of the prism patterns of the optical film 322 may be maintained.

Figure 6:
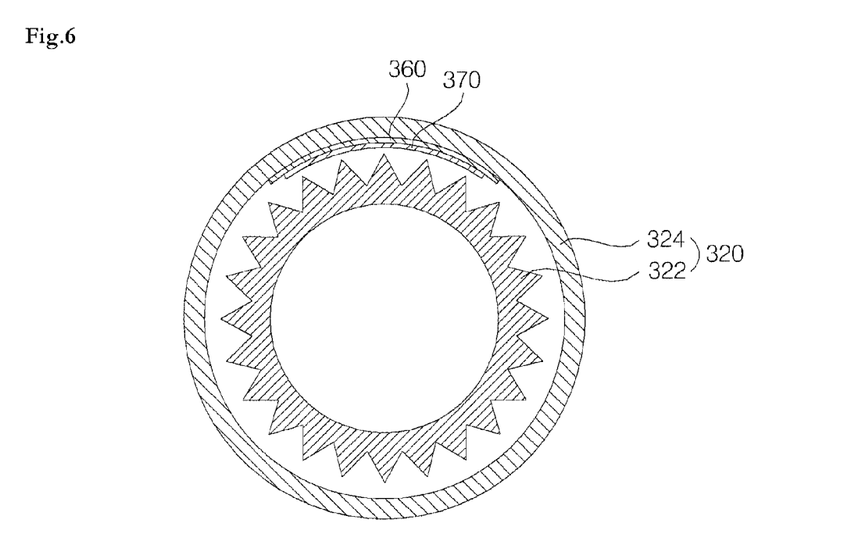
FIG. 6 illustrates a cross-sectional view of a variation of a light pipe taken along line B-B' of FIG. 3.
Figure 7:
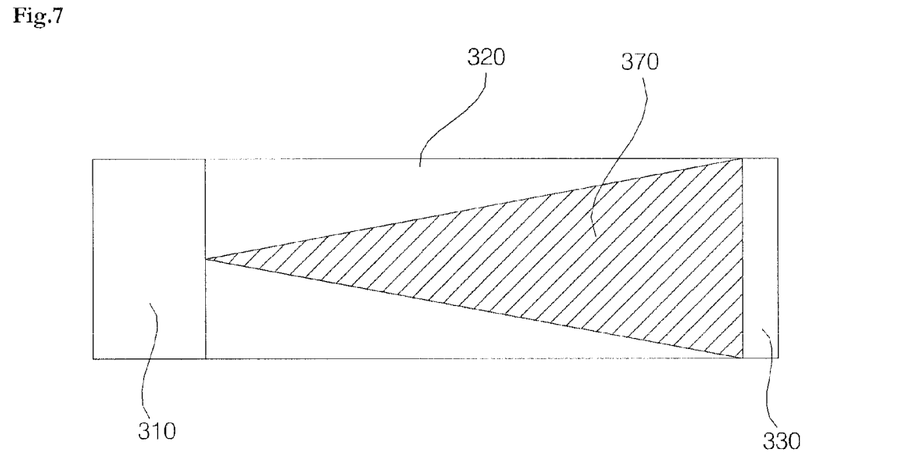
FIG. 7 illustrates a plan view of the illuminating device shown in FIG. 3.

FIG. 6 illustrates a cross-sectional view of a variation of the light pipe 320 taken along line B-B' of FIG. 3. FIG. 7 illustrates a plan view of the illuminating device 300 shown in FIG. 3.

As shown in FIG. 6, the illuminating device 300 may also include at least one of a reflector 360 and an extractor 370. The reflector 360 and the extractor 370 may each be disposed between the optical film 322 and the base pipe 324.

The reflector 360 may reflect light so that light can be emitted from the light pipe 320 in a predetermined direction. The extractor 370 may change an angle of light totally-reflected in the light pipe 320 so that the light can be emitted from the light pipe 320 rather than being totally reflected any longer.

As shown in FIG. 7, a width of the extractor 370 may become larger as it extends from the light source unit 310. An amount of light emitted from a portion of the light pipe 320 distant from the light source unit 310 may be greater than the amount of light emitted from a portion of the light pipe 320 less distant from the light source unit 310. Therefore, the light pipe 320 may uniformly emit light. A width of the extractor 370 at an area near the light source unit 310 is less than a width of the extractor 370 at an area away from the light source unit 310.

Figure 8A:
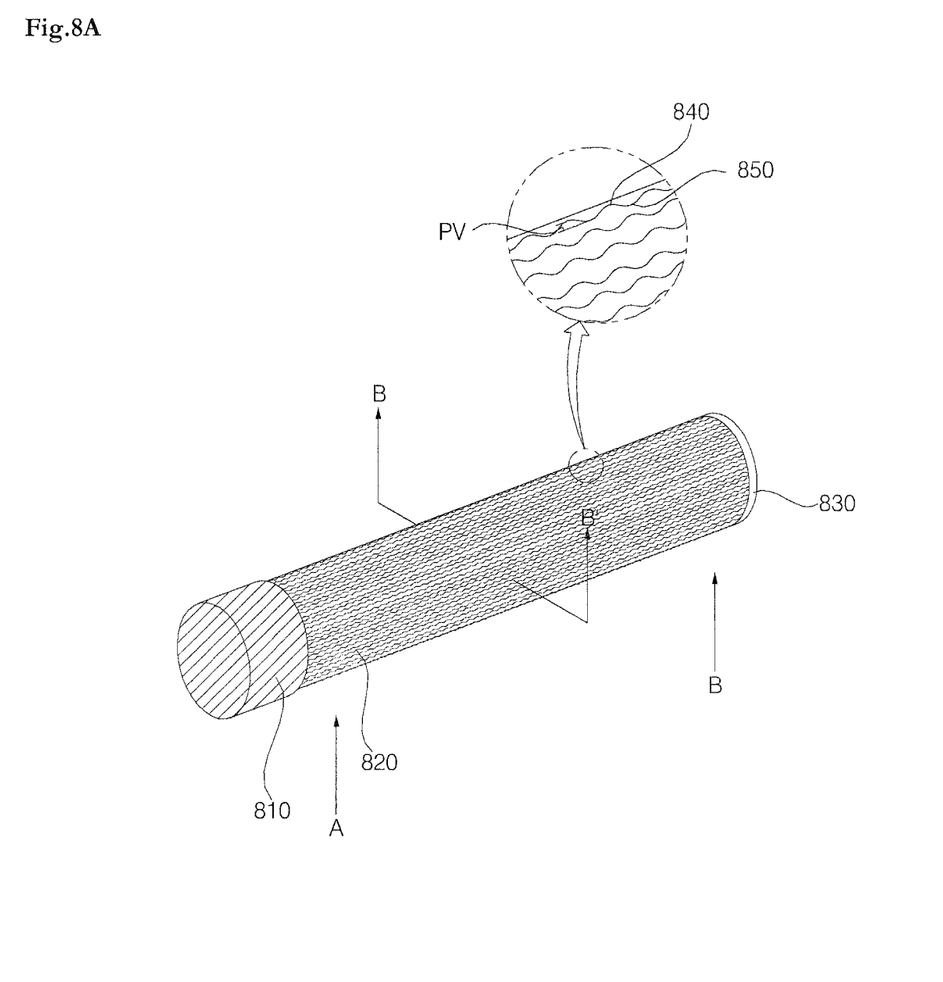
FIG. 8A illustrates a perspective view of an illuminating device according to another example embodiment of the present invention.
Figure 8B:
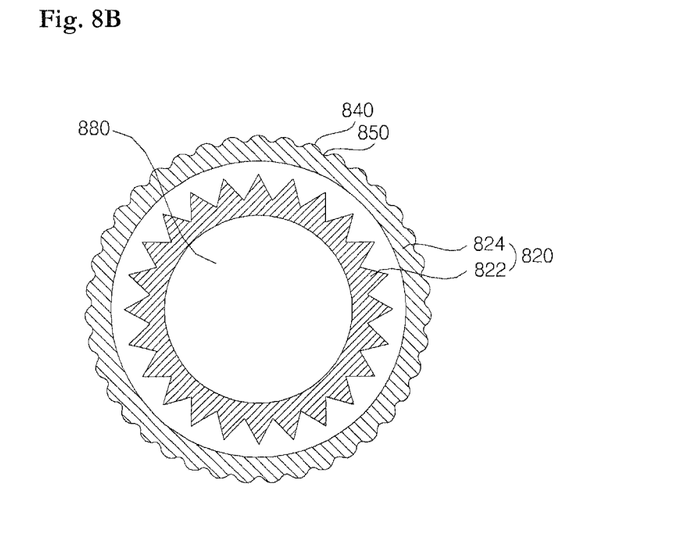
FIG. 8B illustrates a cross-sectional view of the illuminating device taken along line B-B' of FIG. 8A.

FIG. 8A illustrates a perspective view of an illuminating device according to an example embodiment of the present invention. FIG. 8B illustrates a cross-sectional view of the illuminating device taken along line B-B' of FIG. 8A. Other embodiments and configurations are also within the scope of the present invention.

As shown in FIGS. 8A and 8B, either an outer surface or an inner surface of a base pipe 824 of a light pipe 820 may be surface-treated so that a plurality of protrusions 840 (i.e., peaks or vertexes), a plurality of indentations 850 (i.e., valleys or basins) or both can be formed.

The protrusions 840 and the indentations 850 may be formed on the base pipe 824 as wave-like or ripple-like patterns. Thus, the light pipe 820 may uniformly emit light by inducing the diffuse reflection and scattering of light emitted from a light source unit 810.

A density of the protrusions 840 and the indentations 850 may increase according to distance from the light source unit 810. The scattering of light may be facilitated even in regions on the base pipe 824 distant from the light source unit 810. Therefore, the light pipe 820 may more uniformly emit light.

The protrusions 840 and the indentations 850 may be formed through injection, extrusion, thermal curing or ultraviolet (UV) curing. Once the base pipe 824 is surface-treated, the base pipe 824 may have a surface roughness.

Surface roughness is a measure of surface irregularities. The surface roughness of the light pipe 820, and more particularly, a peak-to-valley (PV) (or protrusion-to-indentation) surface roughness of the light pipe 820, may indicate a maximum of differences between heights of the protrusions 840 and depths of the indentations 850. Stated differently, surface roughness may be based on a height distance of one protrusion (or peak) and a depth distance of one indentation (or valley).

Table 1 shows a relationship between surface roughness of the light pipe 820 and illuminance and optical transmittance of the light pipe 820. In the following Table 1, X, O, and ⊚ represent bad, good, and excellent states.

TABLE 1

| PV Surface Roughness | Surface Illuminance of A portion (cd/m$^2$) | Surface Illuminance of B portion (cd/m$^2$) | Optical Transmittance |
|---|---|---|---|
| 2 μm | 11000 | 5000 | ⊚ |
| 3 μm | 6000 | 5450 | O |
| 4 μm | 5900 | 5450 | O |
| 10 μm | 5800 | 5470 | O |
| 20 μm | 5700 | 5490 | O |
| 27 μm | 5620 | 5500 | O |
| 28 μm | 5600 | 5500 | O |
| 30 μm | 5500 | 5500 | O |
| 31 μm | 5400 | 5400 | X |

Referring to Table 1, when the light pipe 820 has a surface roughness of 3 μm or less, a diffuse reflection performance of the light pipe 820 may deteriorate. As a result, a difference between a surface illuminance at one end of the light pipe 820 near the light source unit 810 (i.e., the surface illuminance at portion A) and a surface illuminance at the other end of the light pipe 820 distant from the light source unit 810 (i.e., the surface illuminance at portion B) increases, and thus it may become more difficult for the light pipe 820 to uniformly emit light.

On the other hand, when the light pipe 820 has a surface roughness of 30 μm or more, transmission of light may deteriorate in both portions A and B, and thus the light pipe 820 may not be able to properly emit light.

Therefore, the light pipe 820 may have a surface roughness of approximately 3-30 μm. When the surface roughness of the light pipe 820 is within the range of approximately 3-30 μm, light may be effectively transmitted from one end of the light pipe 820 to the other end of the light pipe 820. This may improve optical transmittance of the light pipe 820.

The outer surface and the inner surface of the base pipe 824 may both be surface-treated. In addition, the protrusions 840, the indentations 850 or both may be formed integrally with the base pipe 824.

The protrusions 840 and the indentations 850 may be formed more densely in areas near a reflecting cap 830 than in areas near the light source unit 810. Thus, the light pipe 820 may uniformly emit light.

FIG. 8B shows that the base pipe includes the optical film 822 with one surface having the prism patterns face the base pipe 824 and the other surface facing a hollow conduit 880.

Figure 9:
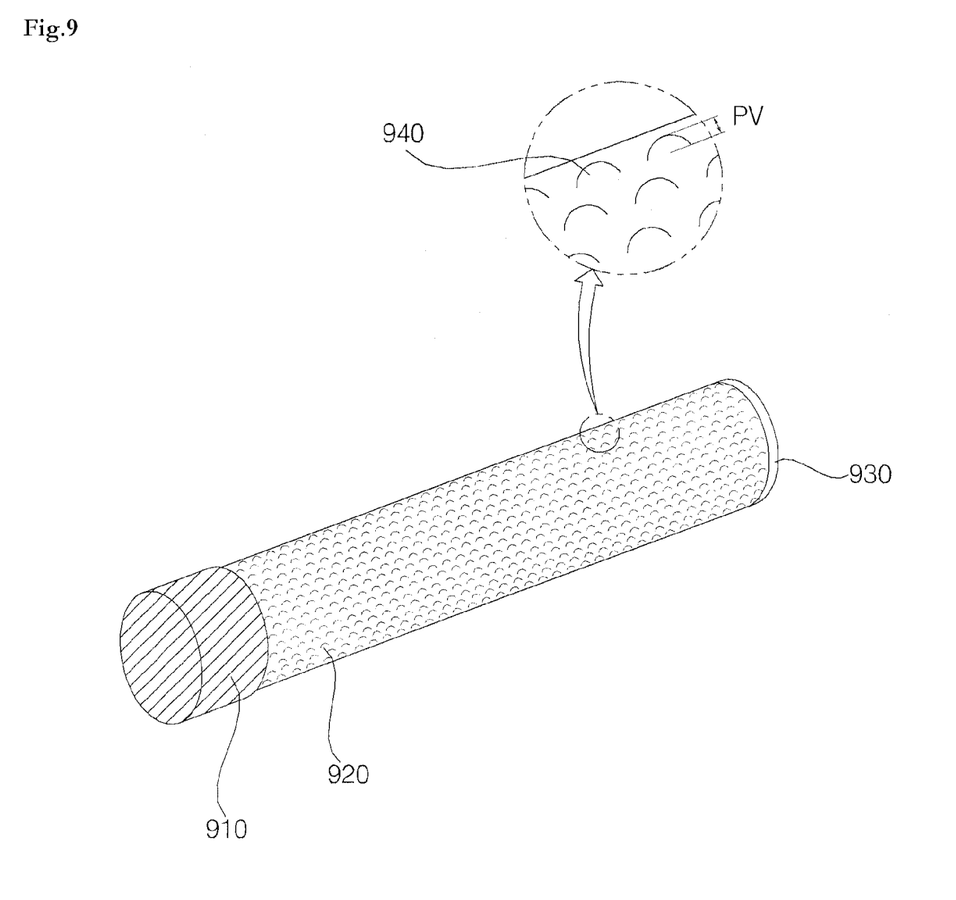
FIG. 9 illustrates a perspective view of an illuminating device according to another example embodiment of the present invention.
Figure 10:
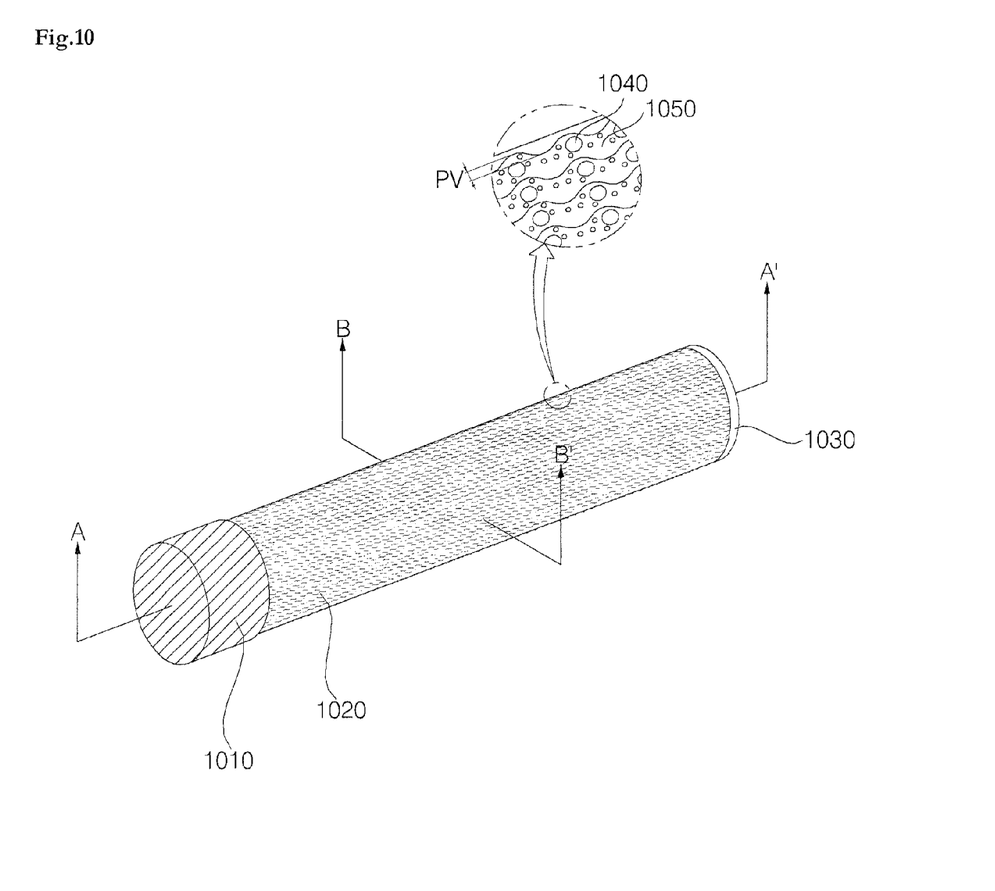
FIG. 10 illustrates a perspective view of an illuminating device according to another example embodiment of the present invention.

FIGS. 9 and 10 illustrate perspective views of illuminating devices according to other example embodiments of the present invention. Other embodiments and configurations are also within the scope of the present invention.

As shown in FIG. 9, a light pipe 920 may be coupled to a light source unit 910 and a reflecting cap 930. A plurality of protrusions 940 may be formed on a surface of a base pipe (of the light pipe 920). The protrusions 940 may be hemispherical. Alternatively, a plurality of indentations may be formed on the surface of the base pipe.

As shown in FIG. 10, a light pipe 1020 may include a base pipe, a light source unit 1010 at one end of the base pipe and a reflecting cap 1030 at another end of the base pipe. A diffusion layer may be formed on the surface of a base pipe in order for the light pipe 1020 to have a surface roughness of approximately 3-30 μm. The diffusion layer may include resin 1050 and a plurality of diffusion particles 1040. The diffusion particles 1040 cause diffuse reflection and scattering of light, and the resin 1050 may enable the diffusion layer to be firmly attached on the surface of the base pipe.

The diffusion particles 1040 may include a silica-based material. The resin 1050 may include a transparent material with well-balanced mechanical, heat-resistant, cold-resistant, and electrical properties such as polyethylene (PE), polypropylene (PP), polycarbonate, polyester or acryl.

The diffusion layer may be formed by applying a paste or slurry obtained by mixing the diffusion particles 1040 and the resin 1050 on a surface of the base pipe. The diffusion layer may be cured by evenly radiating UV rays on the diffusion layer or by performing thermal curing on the diffusion layer.

An outer surface of the base pipe, an inner surface of the base pipe or both may be surface-treated.

Embodiments of the present invention may provide a light pipe that includes a heat-resistant optical film that is stable against heat generated by a lamp, and an illuminating device having the light pipe.

A light pipe is provided that includes a base pipe having a hollow conduit, and an optical film including prism patterns. The optical film is inserted into the hollow conduit along a longitudinal array (or direction) of the prism patterns. A glass transition temperature of the optical film ranges from approximately 110° C. to approximately 180° C.

An illuminating device is provided that includes a light source emitting light, and a light pipe transmitting and distributing the light emitted from the light source. The light pipe includes a base pipe having a hollow conduit and an optical film including prism patterns and inserted into the hollow conduit along a longitudinal array or direction of the prism patterns. A glass transition temperature of the optical film may range from approximately 110° C. to approximately 180° C.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. An illuminating device comprising:
a light source for emitting light;
a shield filter disposed at a front of the light source;
a light pipe for distributing the light from the light source; and
a reflecting cap,
wherein the light source is disposed at a first end of the light pipe, and the reflecting cap is disposed at a second end of the light pipe opposite to the light source,
wherein the light pipe includes:
a base pipe having a hollow conduit, and
an optical film including a plurality of prism patterns each extending along a longitudinal direction of the base pipe, the optical film provided in the hollow conduit of the base pipe, and
at least one of a reflector and an extractor on the base pipe,
wherein a glass transition temperature of the optical film ranges from approximately 110° C. to approximately 180° C.,
wherein a width of the extractor at an area near the light source is less than a width of the extractor at an area further away from the light source,
wherein at least one of protrusions and indentations are provided on a surface of the base pipe, and the surface of the base pipe has a surface roughness ranging from approximately 3 μm to approximately 30 μm,
wherein a density of at least one of the protrusions and the indentations increases according to distance from the light source at the first end of the light pipe to the reflecting cap at the second end of the light pipe, and wherein at least one of the protrusions and the indentations is formed more densely in areas near the reflecting cap than in areas near the light source.

2. The illuminating device of claim 1, wherein the light source is one of a high intensity discharge (HID) lamp, an electrodeless fluorescent lamp (EFL), a solid state lamp, and a metal halide lamp.

3. The illuminating device of claim 1, wherein the optical film is formed of at least one material selected from a group consisting of polycarbonate, syndiotactic polymethyl methacrylate, atatic polymethyl methacrylate, polyether ether ketone, and polyethylene naphthalate.

4. The illuminating device of claim 1, wherein the optical film includes a first surface having the plurality of prism patterns and a second surface opposite the first surface, the second surface being substantially smooth.

5. The illuminating device of claim 1, wherein the surface roughness is based on a height distance of at least one protrusion on the surface of the base pipe and a depth distance of at least one indentation on the surface of the base pipe.

6. The illuminating device of claim 1, wherein at least one of the protrusion and the indentation is formed integrally with the base pipe.

7. The illuminating device of claim 1, wherein the base pipe includes a diffusion layer on a surface of the base pipe, the diffusion layer containing diffusion particles and resin that provide the surface roughness of the diffusion layer ranging from approximately 3 μm to approximately 30 μm.

8. The illuminating device of claim 1, wherein density of the protrusions near the reflecting cap at the second end of the light pipe is greater than density of the protrusions near the light source at the first end of the light pipe.

9. The illuminating device of claim 1, wherein density of the indentations near the reflecting cap at the second end of the light pipe is greater than density of the indentations near the light source at the first end of the light pipe.

10. An illuminating device comprising:
a light pipe;
a light source to emit light;
a shield filter between the light source and the light pipe; and
a reflecting cap wherein the light source is at a first end of the light pipe, and the reflecting cap is at a second end of the light pipe opposite to the light source,
wherein the light pipe includes:
a base pipe having a hollow conduit,
an optical film including a plurality of prism patterns each extending along a longitudinal direction of the base pipe, the optical film provided in the base pipe, and
at least one of a reflector and an extractor on the base pipe, wherein a glass transition temperature of the optical film is in a range from approximately 110° C. to approximately 180° C.,
wherein a width of the extractor at an area near the light source is less than a width of the extractor at an area further away from the light source,
wherein at least one of protrusions and indentations are provided on a surface of the base pipe, and the surface of the base pipe has a surface roughness ranging from approximately 3 μm to approximately 30 μm,
wherein a density of at least one of the protrusions and the indentations increases according to distance from the light source at the first end to the reflecting cap at the second end, and
wherein at least one of the protrusions and the indentations is formed more densely in areas near the reflecting cap at the second end than in areas near the light source at the first end.

11. The illuminating device of claim 10, wherein the light source is a high intensity discharge (HID) lamp, an electrodeless fluorescent lamp (EFL), a solid state lamp, or a metal halide lamp.

12. The illuminating device of claim 10, wherein the optical film is formed of at least one material selected from a group consisting of polycarbonate, syndiotactic polymethyl methacrylate, atatic polymethyl methacrylate, polyether ether ketone, and polyethylene naphthalate.

13. The illuminating device of claim 10, wherein the optical film includes a first surface having the plurality of prism patterns and a second surface opposite the first surface, the second surface being substantially smooth.

14. The illuminating device of claim 10, wherein the surface roughness is based on a height distance of at least one protrusion on the surface of the base pipe and a depth distance of at least one indentation on the surface of the base pipe.

15. The illuminating device of claim 10, wherein the protrusion or the indentation is formed integrally with the base pipe.

16. The illuminating device of claim 10, wherein the base pipe includes a diffusion layer on a surface of the base pipe, the diffusion layer containing diffusion particles and resin that provide the surface roughness of the diffusion layer ranging from approximately 3 μm to approximately 30 μm.

17. The illuminating device of claim 10, wherein density of the protrusions near the reflecting cap at the second end of the light pipe is greater than density of the protrusions near the light source at the first end of the light pipe.

18. The illuminating device of claim 10, wherein density of the indentations near the reflecting cap at the second end of the light pipe is greater than density of the indentations near the light source at the first end of the light pipe.

* * * * *